United States Patent
Wong et al.

(10) Patent No.: US 10,263,234 B2
(45) Date of Patent: Apr. 16, 2019

(54) ASYMMETRIC SEPARATOR FOR SECONDARY BATTERY

(71) Applicant: GRST International Limited, Hong Kong (HK)

(72) Inventors: Sing Ming Tony Wong, Hong Kong (HK); Sing Hung Eric Wong, Hong Kong (HK); Peihua Shen, Guangdong (CN); Yuen Hung, Hong Kong (HK); Kam Piu Ho, Hong Kong (HK); Ranshi Wang, Hong Kong (HK)

(73) Assignee: GRST International Limited, Hong Kong (HK)

( * ) Notice: Subject to any disclaimer, the term of this patent is extended or adjusted under 35 U.S.C. 154(b) by 46 days.

(21) Appl. No.: 15/604,613

(22) Filed: May 24, 2017

(65) Prior Publication Data
US 2017/0346063 A1   Nov. 30, 2017

Related U.S. Application Data

(60) Provisional application No. 62/341,083, filed on May 25, 2016.

(51) Int. Cl.
| *H01M 2/16* | (2006.01) |
| *H01M 2/18* | (2006.01) |
| *H01M 10/0525* | (2010.01) |

(52) U.S. Cl.
CPC ......... *H01M 2/1686* (2013.01); *H01M 2/162* (2013.01); *H01M 2/166* (2013.01); *H01M 2/18* (2013.01); *H01M 10/0525* (2013.01)

(58) Field of Classification Search
CPC .... H01M 2/162; H01M 2/166; H01M 2/1686; H01M 2/18; H01M 10/0525
See application file for complete search history.

(56) References Cited

U.S. PATENT DOCUMENTS

| 7,709,140 | B2 | 5/2010 | Hennige et al. | |
| 2006/0078791 | A1* | 4/2006 | Hennige | H01M 2/1646 |
| | | | | 429/145 |
| 2012/0028103 | A1* | 2/2012 | Weber | H01M 2/162 |
| | | | | 429/145 |
| 2016/0093860 | A1* | 3/2016 | Miyazaki | H01M 10/0525 |
| | | | | 429/144 |

FOREIGN PATENT DOCUMENTS

CN           102388484 B        5/2014

\* cited by examiner

*Primary Examiner* — Brittany L Raymond (57) ABSTRACT

Provided herein is a separator used for an electrochemical device such as a lithium-ion battery. The separator disclosed herein comprises a porous base material, a first protective porous layer coated on one side of the porous base material, and a second protective porous layer coated on the other side of the porous base material, wherein the first protective porous layer comprises an organic binder and a first inorganic filler, and wherein the second protective porous layer comprises an organic binder and a second inorganic filler different from the first inorganic filler. Also provided herein is a lithium-ion battery including the separator disclosed herein. The separator disclosed herein is excellent in terms of safety, ion permeability, and cycle characteristics.

18 Claims, 2 Drawing Sheets

Figure 3

ASYMMETRIC SEPARATOR FOR SECONDARY BATTERY

CROSS-REFERENCE TO RELATED APPLICATION

This application claims the benefit of U.S. Provisional Patent Application No. 62/341,083, filed on May 25, 2016, the entire content of which is hereby incorporated by reference.

FIELD OF THE INVENTION

This invention relates to a separator used for an electrochemical device such as a lithium-ion battery and a lithium-ion battery including the separator disclosed herein.

BACKGROUND OF THE INVENTION

Lithium-ion batteries (LIBs) have been widely utilized in various applications especially consumer electronics such as laptop computers, mobile phones, and digital cameras, etc. Recently lithium-ion batteries have started to be used in automobiles due to their superior energy and power density.

LIBs generally include an anode, a cathode, a separator, and an electrolyte. The anode and cathode are separated from one another by a separator in order to prevent short circuit while maintaining ion conductivity.

A separator is conventionally a thin, porous, electrically insulating material having high ion permeability, good mechanical strength and long-term stability to the chemicals and solvents used in the system, for example electrolyte of the electrochemical cell.

Separator for use in high performance battery system must be safe since very large quantities of energy are stored in the fully charged state in the battery. These energies must not be released in an uncontrolled manner in the event of malfunctioning of the battery, such as overcharging or short-circuit, since this would lead to an explosion or ignition of the battery.

Generally, a typical organic separator consists of a composite film comprising a polyolefin-based substrate and an inorganic coating layer. A major disadvantage of these polyolefin-based separators is their low thermal stability limit. When the battery temperature exceeds 150° C. or lower, the organic separator rapidly shrinks. A cathode and an anode will directly contact to each other, to cause enlargement of short-circuited area. Therefore, such a separator is prone to cause battery short circuit and is generally not safe.

The electrodeposition of lithium metal on the anode is another cause of failure in lithium batteries. The growth of lithium dendrites can pierce the separator causing a short circuit. Therefore, thermal and mechanical stabilities of the separator are the most important factors for battery safety.

There are different types of materials which are suitable for membrane modification. The most common approach for improving the thermal and mechanical stabilities of a separator is to apply ceramic materials such as inorganic oxides on the surface of the separator to form a composite membrane. This inorganic composite membrane as the separator for Li-ion batteries has good thermal and mechanical stabilities.

However, there is a trade-off between the performance, such as porosity/transport properties, and mechanical robustness when designing safe battery separators. High separator performance is decisively dependent on the ion-conducting properties. The ion conductivity of the separator therefore has to be high. This will best be achieved with the separator having coarse pores and low thickness. But at the same time a separator having fine pores and a relatively high thickness offers desirable safety features.

Moreover, different safety features are required for anode and cathode in lithium-ion batteries. Prevention of the growth of dendrites from anode to cathode is required. Otherwise, it would cause internal shorting. In addition, a large amount of heat may be generated by decomposition of cathode having a high oxidation state. Although coated separator can improve safety of the battery, it is unlikely that specific needs of different electrodes can be satisfied with the same inorganic coating material. A coating having a small pore structure, which is adjacent to the anode, prevents the Li dendrites from contacting the cathode. Inorganic material having high porosity and low thermal conductivity is preferred for a coating in contact with the cathode.

U.S. Pat. No. 7,709,140 B2 has disclosed a separator with asymmetrical pore structures comprising a first porous layer and a second porous layer, wherein the first porous layer and second porous layer have different average pore sizes and are in contact with different electrodes. However, the separator is designed without compatibility consideration with respect to characteristics of different electrodes. Therefore, safety and performance of the battery are not optimized.

CN Patent No. 102388484 B has disclosed an asymmetrical separator comprising an anode side and a cathode side, wherein each of the anode side and cathode side comprises a filler, wherein the filler at the anode side comprises $Al_2O_3$ and the filler at the cathode side comprises polyvinylidene fluoride (PVDF). However, the separator is only designed to meet different requirements in terms of chemical or electrochemical stability needed on both electrodes.

It is one of the objectives of the present invention to overcome the disadvantages and problems mentioned above.

SUMMARY OF THE INVENTION

The aforementioned needs are met by various aspects and embodiments disclosed herein. In one aspect, provided herein is a secondary-battery separator comprising, a porous base material, a first protective porous layer coated on one side of the porous base material, and a second protective porous layer coated on the other side of the porous base material, wherein the first protective porous layer comprises an organic binder, and a first inorganic filler;

wherein the first inorganic filler is a first whisker-type material selected from the group consisting of $Al_2O_3$, $SiO_2$, $TiO_2$, $ZrO_2$, $BaO_x$, $ZnO$, $CaCO_3$, $TiN$, $AlN$, $MTiO_3$, $K_2O \cdot nTiO_2$, $Na_2O \cdot mTiO_2$, and combinations thereof, wherein x is 1 or 2; M is Ba, Sr or Ca; n is 1, 2, 4, 6 or 8; and m is 3 or 6;

wherein the second protective porous layer comprises an organic binder, and a second inorganic filler; and wherein the second inorganic filler is different from the first inorganic filler in at least one property selected from shape, size, and chemical composition.

In some embodiments, the first whisker-type material is randomly distributed throughout the first protective porous layer. In certain embodiments, the first whisker-type material has a diameter from about 0.05 µm to about 3 µm. In certain embodiments, the first whisker-type material has a ratio of length to diameter from about 5 to about 300.

In certain embodiments, the first inorganic filler further comprises a first particulate-type material selected from the group consisting of $Al_2O_3$, $SiO_2$, $TiO_2$, $ZrO_2$, $BaO_x$, ZnO, $CaCO_3$, TiN, AlN, and combinations thereof, wherein x is 1 or 2. In some embodiments, the first particulate-type material has an average diameter from about 100 nm to about 10 µm.

In some embodiments, the first protective porous layer is a single-layered structure. In certain embodiments, the first particulate-type material and the first whisker-type material are randomly distributed throughout the first protective porous layer.

In certain embodiments, the protective porous layer is a two-layered structure comprising a first layer and a second layer, wherein the first layer is adjacent to the porous base material, and the second layer is on and in contact with the first layer. In some embodiments, the first particulate-type material resides in the first layer and the first whisker-type material resides in the second layer, wherein the first whisker-type material are randomly distributed throughout the second layer. In other embodiments, a substantial portion of the first particulate-type material resides in the first layer and a substantial portion of the first whisker-type material resides in the second layer, wherein the first whisker-type material is randomly distributed throughout the second layer.

In some embodiments, the average thickness ratio of the second layer to the first layer is from about 1:3 to about 3:1.

In certain embodiments, the second inorganic filler is a second particulate-type material selected from the group consisting of $Al_2O_3$, $SiO_2$, $TiO_2$, $ZrO_2$, $BaO_x$, ZnO, $CaCO_3$, TiN, AlN, and combinations thereof, wherein x is 1 or 2; wherein the second particulate-type material has a diameter from about 1 µm to about 15 µm. In further embodiments, the second inorganic filler further comprises a third particulate-type material selected from the group consisting of $Al_2O_3$, $SiO_2$, $TiO_2$, $ZrO_2$, $BaO_x$, ZnO, $CaCO_3$, TiN, AlN, and combinations thereof, wherein x is 1 or 2; wherein the third particulate-type material has a diameter from about 400 nm to about 2 µm.

In other embodiments, the second inorganic filler is a second whisker-type material selected from the group consisting of $Al_2O_3$, $SiO_2$, $TiO_2$, $ZrO_2$, $BaO_x$, ZnO, $CaCO_3$, TiN, AlN, $MTiO_3$, $K_2O.nTiO_2$, $Na_2O.mTiO_2$, and combinations thereof, wherein x is 1 or 2; M is Ba, Sr or Ca; n is 1, 2, 4, 6 or 8; and m is 3 or 6.

In some embodiments, the first protective porous layer is adjacent to a cathode and the second protective porous layer is adjacent to an anode.

In certain embodiments, the second protective porous layer has a smaller pore size than the first protective porous layer.

In some embodiments, the average thickness ratio of the first protective porous layer to the second protective porous layer is from about 1:3 to about 3:1.

In certain embodiments, the porous base material is a non-woven fabric consisting of natural or polymeric fibers. In some embodiments, the polymeric fibers of the porous base material have a melting point of 200° C. or higher. In certain embodiments, the polymeric fibers of the porous base material are selected from the group consisting of polyester, polyacetal, polyamide, polycarbonate, polyimide, polyetherether ketone, polyether sulfone, polyphenylene oxide, polyphenylene sulfide, polyethylene naphthalate, and combinations thereof. In some embodiments, the polyester is polyethylene terephthalate, polybutylene terephthalate, or a combination thereof.

In certain embodiments, the organic binder is selected from the group consisting of a polyester, polyamide, polyether, polyimide, polycarboxylate, polycarboxylic acid, polyvinyl compound, polyolefin, rubber, polyvinyl pyrrolidone, polyacrylic acid, polyacrylate, polymethacrylic acid, polymethacrylate, polystyrene, polyvinyl alcohol, polyvinyl acetate, polyacrylamide, cellulose, cellulose acetate, cellulose acetate butyrate, cellulose acetate propionate, carboxymethyl cellulose, cyanoethylcellulose, cyanoethylsucrose, polyurethane, nitrile butadiene rubber (NBR), styrene butadiene rubber (SBR), latex, acrylonitrile-styrene-butadiene copolymer, fluorinated polymer, chlorinated polymer, and combinations thereof.

In some embodiments, the weight ratio of the first or second inorganic filler to the organic binder is from about 99:1 to about 1:1.

In certain embodiments, the separator has a thickness from about 1 µm to about 80 µm, and a porosity from about 40% to about 97%.

In some embodiments, the difference in tensile strength of the separator along the TD direction and MD direction is about 15% or less.

In another aspect, provided herein is a method for producing a battery, comprising, inserting the separator disclosed herein into the battery.

Also provided herein is a lithium battery comprising the separator disclosed herein.

DETAILED DESCRIPTION OF THE INVENTION

General Definitions

The term "porous base material" refers to a substrate having pores or voids inside. The material used as a component of the porous base material may be an organic material or an inorganic material as long as the material is an electrically insulating material. Any porous base material that has an electrically insulating property can be used herein. Some non-limiting examples of the porous base material include a porous sheet formed of a fibrous material, such as woven or nonwoven fabric or a paper-like sheet. Some non-limiting examples of the fibrous material include natural and polymeric fibers.

The term "non-woven" refers to products made by processes that do not include weaving nor knitting. The fibers in these materials are bonded together by chemical, mechanical, heat or solvent treatment.

The term "polymer" refers to a polymeric compound prepared by polymerizing monomers, whether of the same or a different type. The generic term "polymer" embraces the terms "homopolymer," "copolymer," "terpolymer" as well as "interpolymer."

The term "interpolymer" refers to a polymer prepared by the polymerization of at least two different types of monomers. The generic term "interpolymer" includes the term "copolymer" (which generally refers to a polymer prepared from two different monomers) as well as the term "terpolymer" (which generally refers to a polymer prepared from three different types of monomers). It also encompasses polymers made by polymerizing four or more types of monomers.

The term "polyester" refers to a polymer having an ester functional group in each repeating unit on its main chain. Some non-limiting examples of suitable polyester include polyethylene terephthalate (PET), polybutylene terephthalate (PBT), polyethylene naphthalate (PEN), and poly(cyclohexanedimethylene terephthalate) (PCT).

The term "protective porous layer" refers to one or more layers coated on a porous base material. The protective porous layer includes a mixture of at least one organic binder and at least one inorganic filler. The protective porous layer may further comprise one or more additives, in addition to the organic binder and inorganic filler. The protective porous layer may have a single-layered, two-layered, or multi-layered structure.

The term "organic binder" refers to a substance used for joining an inorganic filler to a porous base material or to each other. Any organic binder that can join the inorganic filler to the porous base material or to each other can be used herein. Some non-limiting examples of the organic binder include polyester, polyamide, polyacrylic acid, polyether, polyimide, polyolefin, rubber, styrene-butadiene rubber (SBR), acrylonitrile-butadiene rubber, cellulose, cellulose derivative, latex, and combinations thereof.

The term "unsaturated polymer" refers to a polymer having one or more unsaturated groups in the polymer chain. The unsaturated groups can be, for example, carbon-carbon double or triple bonds or carbon-nitrogen double or triple bonds.

The term "conjugated diene polymer" refers to a homopolymer of a conjugated diene, copolymer of two or more different conjugated dienes and copolymer of a conjugated diene and a vinyl-substituted aromatic hydrocarbon. Some non-limiting examples of the conjugated diene polymer include polybutadiene, polyisoprene, butadiene/styrene random copolymer, isoprene/styrene random copolymer, acrylonitrile/butadiene copolymer, acrylonitrile/butadiene/styrene copolymer, butadiene/styrene block copolymer, styrene/butadiene/styrene block copolymer, isoprene/styrene block copolymer, and styrene/isoprene/styrene block copolymer.

The term "block copolymer" refers to a polymer including two or more polymer blocks.

The term "polymer block" refers to a grouping of multiple monomer units, which can be the same (e.g., a homopolymer block) or different (e.g., a copolymer block, a random copolymer block, etc.), and which are part of a continuous polymer chain, which forms part of a larger polymer. A wide variety of block copolymers is contemplated herein including diblock copolymers (i.e., polymers including two polymer blocks), triblock copolymers (i.e., polymers including three polymer blocks), multiblock copolymers (i.e., polymers including more than three polymer blocks), and combinations thereof.

The term "inorganic filler" refers to a substance that is electrically non-conductive. Some non-limiting examples of the inorganic filler include metal oxides, and non-oxide and non-metallic materials. Some non-limiting examples of the metal oxides include aluminium oxides, zirconium oxides, barium titanate, lead zirconate titanates, ferrites, zinc oxide, and combinations thereof. Some non-limiting examples of the non-oxide and non-metallic materials include silicon carbide, silicon nitride, aluminium nitride, boron nitride, titanium boride, molybdenum silicide, and combinations thereof.

The term "whisker-type material" refers to an inorganic material in a needle-like form. In some embodiment, the needle-like form has a regular shape, such as circular or polygonal shape. In certain embodiment, the needle-like form has a uniform thickness along its length. In other embodiment, the diameter of the whisker varies along its length, and the shape of the whisker may be irregular with alternating thick and thin sections.

The term "whisker" refers to a particle having an aspect ratio (i.e. length to diameter ratio) of about 5 or more.

The term "diameter of a whisker-type material" refers to a maximum cross-sectional dimension of a whisker.

The term "tensile strength" refers to the maximum stress a material subjected to a stretching load can withstand without tearing.

The term "machine direction" or "MD direction" refers to the direction along the length of the separator. The MD direction is also referred to as a "longitudinal direction."

The term "transverse direction" or "TD direction" refers to the direction across the separator or perpendicular to the machine direction. The TD direction is also referred to as a "width direction."

The term "first layer of the protective porous layer" refers to a layer adjacent to a porous base material.

The term "second layer of the protective porous layer" refers to a layer on and in contact with the first layer of protective porous layer.

The term "substantial portion" of an inorganic filler refers to a portion greater than 99.9%, greater than 99.5%, greater than 99%, greater than 98%, greater than 97%, greater than 96%, greater than 95%, greater than 90%, greater than 85%, greater than 80%, greater than 75%, greater than 70%, greater than 65%, greater than 60%, greater than 55%, or greater than 50%, based on the total volume or weight of the inorganic filler.

The term "first side of the protective porous layer" refers to a side adjacent to a porous base material.

The term "second side of the protective porous layer" refers to a side adjacent to an anode or a cathode.

The term "porosity" refers to the total void space in a material attributable to the presence of pores, or the ratio of the pore volume to the total volume of a material. In the case where the separator is made up of a porous base material and a protective porous layer, the number of pores of the separator is the sum of the number of pores of the porous base material and the number of pores of the protective porous layer.

The term "pore volume" refers to the total void space in a material attributable to the presence of pores in units of volume percent.

The term "average pore size" refers to a value calculated by a formula 4V/S where S is a specific surface area and V is a pore volume per unit mass obtained from a pore size distribution measured by a mercury compression method.

The term "cylindrical pore" or "cylindrically shaped pore" refers to a pore formed through the top and the bottom of the separator, of which a cross section is circular or nearly circular on both the top and the bottom, and each cross section at the top, bottom and passage has the same or similar size.

The term "heat resistance" refers to a characteristic in which melting or decomposition does not occur in a temperature range of 200° C. or lower.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour and the full energy in 10 hours; and a 5 C means utilization of the full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3600 coulombs of electrical charge. Similarly, the term "miniampere-hour (mAh)" also refers to a unit of the storage capacity of a battery and is 1/1,000 of an ampere-hour.

The term "doctor blading" refers to a process for fabrication of large area films on rigid or flexible substrates. A coating thickness can be controlled by an adjustable gap width between a coating blade and coating surface, which allows the deposition of variable wet layer thicknesses.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

The present invention provides a secondary-battery separator comprising, a porous base material, a first protective porous layer coated on one side of the porous base material, and a second protective porous layer coated on the other side of the porous base material, wherein the first protective porous layer comprises an organic binder, and a first inorganic filler;

wherein the first inorganic filler is a first whisker-type material selected from the group consisting of $Al_2O_3$, $SiO_2$, $TiO_2$, $ZrO_2$, $BaO_x$, $ZnO$, $CaCO_3$, $TiN$, $AlN$, $MTiO_3$, $K_2O \cdot nTiO_2$, $Na_2O \cdot mTiO_2$, and combinations thereof, wherein x is 1 or 2; M is Ba, Sr or Ca; n is 1, 2, 4, 6 or 8; and m is 3 or 6;

wherein the second protective porous layer comprises an organic binder, and a second inorganic filler; and wherein the second inorganic filler is different from the first inorganic filler in at least one property selected from shape, size, and chemical composition.

The separator disclosed herein is suitable for primary and secondary (rechargeable) lithium batteries, for nickel metal hydride, nickel-cadmium, and silver-zinc batteries. It is also suitable for use in battery systems with comparatively high operating temperatures.

Generally, conventional polyolefin separator has a relatively isotropic pore structure on both sides of the separator. The present invention provides asymmetric separators having anisotropic properties on both sides of the separator. The asymmetric separators disclosed herein having different materials on both sides of the separators make it possible to improve safety of battery without compromising its performance. The asymmetric separators disclosed herein not only meet the performance requirement in lithium high power batteries but also allow the battery system to operate in a safe and reliable state.

The separator of the present invention also has a distinct advantage over separators based on woven or non-woven polymeric or ceramic fabrics as described in prior art. One reason for this is that the separators disclosed herein exhibits a high and similar tensile strength in both TD and MD directions and hence a high tearing resistance.

The porous base material may comprise woven or non-woven polymeric fibers, natural fibers, carbon fibers, glass fibers or ceramic fibers. In some embodiments, the porous base material comprises woven or nonwoven polymeric fibers.

In certain embodiment, the porous base material is a nonwoven comprising polymeric fibers. In some embodiment, the fibers of the nonwoven could be made of organic polymers, such as polyolefin, polyester, polyacetal, polyamide, polycarbonate, polyimide, polyetherether ketone, polysulfones, polyphenylene oxide, polyphenylene sulfide, polyacrylonitrile, polyvinylidene fluoride, polyoxymethylene, polyvinyl pyrrolidone, or a combination thereof. But all other known polymeric fibers or many natural fibers can be used as well.

Some non-limiting examples of suitable polyolefin include polypropylene, polyethylene, and polypropylene/polyethylene co-polymer.

In order to improve thermal stability of the nonwoven, the fibers having a melting temperature of 200° C. or above should be used. In some embodiment, the fibers are selected from polyester. Some non-limiting examples of suitable polyester include polyethylene terephthalate, polybutylene terephthalate, polyethylene naphthalate, polybutylene naphthalate, derivatives thereof, and combinations thereof. The use of these organic polymers allows the production of a separator that exhibits only a small amount of thermal shrinkage.

The nonwoven fabric may be produced by a publicly known process. Some non-limiting examples of suitable process include dry process, spun bond process, water needle process, spun lace process, wet process, melt-blowing process and the like.

In some embodiment, the natural or polymeric fibers of the porous base material have an average thickness from about 0.5 μm to about 10 μm, from about 1 μm to about 10 μm, from about 1.5 μm to about 10 μm, from about 1 μm to about 7 μm, from about 1 μm to about 5 μm, or from about 2.5 μm to about 7.5 μm. In certain embodiments, the fibers of the porous base material have an average thickness from about 0.2 μm to about 10 μm.

If the average thickness of fibers is less than 0.2 μm, the non-woven fabric produced has deteriorated mechanical properties. Also, if the average thickness of fibers is greater than 10 μm, it is not easy to control the size of pores in the non-woven fabric.

In some embodiments, the porous base material has a thickness from about 10 μm to about 200 μm, from about 30 μm to about 100 μm, from about 15 μm to about 80 μm, from about 25 μm to about 50 μm, from about 15 μm to about 40 μm, from about 15 μm to about 30 μm, from about 15 μm to about 25 μm, from about 15 μm to about 20 μm, or from about 10 μm to about 20 μm.

The thickness of the porous base material has a considerable influence on the properties of the separator. Thinner separators allow an increased packing density in a battery pack since a larger amount of energy can be stored in the same volume.

In some embodiments, the porous base material has a thickness of about 15 μm, about 20 μm, or about 25 μm.

Separators having such a thickness make it possible to build very compact batteries with a high energy density.

The separator of the present invention includes a planar nonwoven fabric base material having a plurality of pores.

In some embodiment, the porous base material has an average pore size from about 10 nm to about 2000 nm, from about 150 nm to about 1500 nm, from about 20 nm to about 1000 nm, from about 300 nm to about 1000 nm, from about 300 nm to about 800 nm, or from about 300 nm to about 500 nm.

Porosity of the porous base material in this context is defined as the volume of the nonwoven (100%) minus the volume of the fibers of the nonwoven, i.e. the fraction of the volume of the nonwoven that is not taken up by material. The volume of the nonwoven can be calculated from the dimensions of the nonwoven. The volume of the fibers is calculated from the measured weight of the nonwoven in question and the density of the polymeric fibers.

In some embodiment, the porous base material has a porosity from about 50% to about 97%, from about 50% to about 95%, from about 50% to about 80%, from about 55% to about 90%, from about 55% to about 80%, from about 60% to about 95%, from about 60% to about 90%, from about 60% to about 80%, from about 65% to about 90%, from about 65% to about 80%, from about 70% to about 90%, from about 70% to about 80%, from about 75% to about 90%, or from about 80% to about 90%.

The nature of the porous base material disclosed herein, which comprises a particularly useful combination of thickness and porosity, makes it possible to produce separators which meet the requirements for separators in high power batteries, especially lithium high power batteries.

In some embodiments, the first inorganic filler comprises a whisker-type material and does not comprise a particulate-type material. In certain embodiments, the first inorganic filler is a first whisker-type material.

The whisker-type material has a needle-like, acicular shape, which has a high elastic modulus. Some non-limiting examples of the whisker-type material include inorganic oxides, carbides, borides, nitrides, and combinations thereof.

In certain embodiments, the first whisker-type material in the first protective porous layer is randomly oriented, forming a network structure. The use of the whisker-type material provides great improvements in the mechanical properties of the separator over particulate-type material in both TD direction and MD direction. Hence, it improves the fracture toughness, hardness and strength of the separator. The first protective porous layer containing the whisker-type material also dramatically improves abrasion resistance of the separator.

Separators disclosed herein also achieves a good cathode compatibility. Although both nano-particulates and nano-whiskers have high surface to volume (S/V) ratio, whiskers have a relatively smaller filler-substrate contact compared to particulates due to the formation of a whisker network. Therefore, the protective porous layer containing whiskers has relatively low thermal conductivity, which make it difficult to rapidly transfer heat throughout the cathode to the substrate.

In some embodiments, the first protective porous layer comprising a first whisker-type material and a first particulate-type material selected from the group consisting of $Al_2O_3$, $SiO_2$, $TiO_2$, $ZrO_2$, $BaO_x$, ZnO, $CaCO_3$, TiN, AlN, and combinations thereof, wherein x is 1 or 2. In certain embodiments, the first protective porous layer comprising a first particulate-type material and a first whisker-type material has a single-layered structure, wherein the first particulate-type material and the whisker-type material are randomly distributed throughout the first protective porous layer. In certain embodiments, the first whisker-type material and first particulate-type material can be stably fixed by an organic binder on the surface of the porous base material. The first particulate-type material can also be fixed in a part of the pores of the porous base material.

In certain embodiments, the first protective porous layer comprising a first particulate-type material and a first whisker-type material has a two-layered structure comprising a first layer and a second layer, wherein the first layer is adjacent to the porous base material, and the second layer is on and in contact with the first layer. In some embodiments, the first particulate-type material resides in the first layer and the first whisker-type material resides in the second layer. In other embodiments, a substantial portion of the first particulate-type material resides in the first layer and a substantial portion of the first whisker-type material resides in the second layer. The first particulate-type material can be stably fixed by an organic binder on the surface of the porous base material, and in a part of the pores of the porous base material to form a first layer of the first protective porous layer. The first whisker-type material can be stably fixed by an organic binder on the surface of the first layer to form a second layer of the first protective porous layer.

In some embodiments, the average thickness ratio of the second layer of the first protective porous layer to the first layer of the first protective porous layer is from about 1:3 to about 3:1.

In certain embodiments, the average thickness ratio of the second layer of the first protective porous layer to the first layer of the first protective porous layer is about 1:3, about 1:2.5, about 1:2, about 1:1.5, about 1:1.3, about 1:1, about 1.3:1, about 1.5:1, about 2:1, about 2.5:1, or about 3:1.

In some embodiment, a weight ratio of the first whisker-type material to the first particulate-type material in the first protective porous layer is from about 1:1 to about 99:1, from about 70:30 to about 95:5, from about 95:5 to about 35:65, from about 65:35 to about 45:55, from about 20:80 to about 99:1, from about 10:90 to about 99:1, from about 5:95 to about 99:1, from about 3:97 to about 99:1, from about 1:99 to about 99:1, or from about 1:99 to about 1:1.

In some embodiments, the second inorganic filler comprises a particulate-type material and does not comprise a whisker-type material. In certain embodiments, the second inorganic filler is a second particulate-type material selected from the group consisting of $Al_2O_3$, $SiO_2$, $TiO_2$, $ZrO_2$, $BaO_x$, ZnO, $CaCO_3$, TiN, AlN, and combinations thereof, wherein x is 1 or 2.

Figure 1:
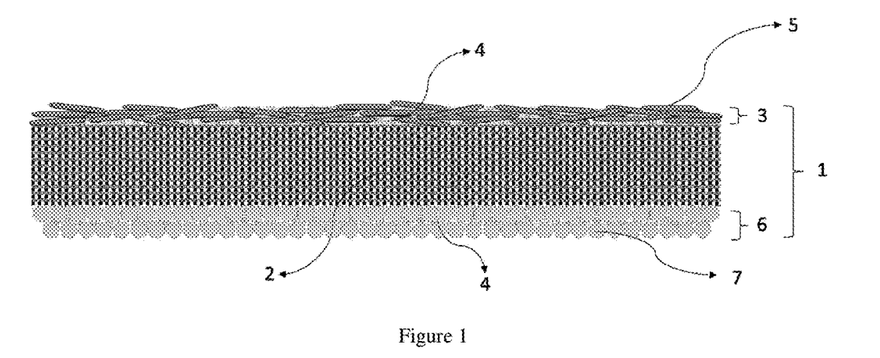
FIG. 1 depicts a schematic structure of a separator of Example 1.

FIG. 1 shows a schematic structure of a separator (1) of Example 1, in which a first protective porous layer (3) having a single-layered structure comprising a first whisker-type material (5) and an organic binder (4) is formed on one side of a porous base material (2), and a second protective porous layer (6) having a single layered structure comprising a second particular-type material (7) and an organic binder (4) is formed on the other side of the porous base material (2).

Figure 2:
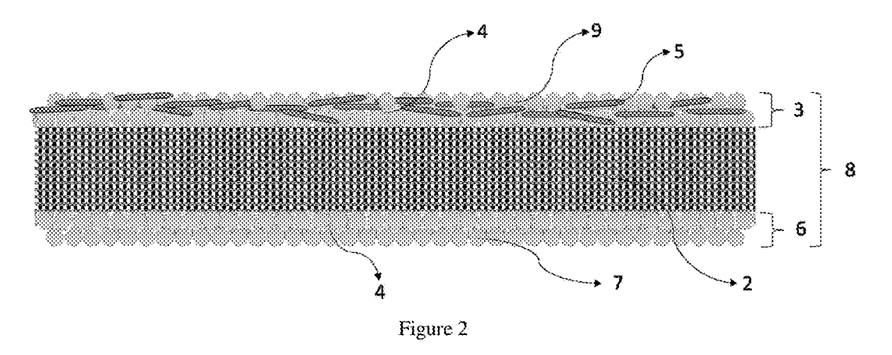
FIG. 2 depicts a schematic structure of a separator of Example 3.

FIG. 2 shows a schematic structure of a separator (8) of Example 3, in which a first protective porous layer (3) having a single-layered structure comprising a first whisker-type material (5), a first particular-type material (9) and an organic binder (4) is formed on one side of a porous base material (2), and a second protective porous layer (6) having a single layered structure comprising a second particular-type material (7) and an organic binder (4) is formed on the other side of the porous base material (2).

In certain embodiments, the second inorganic filler comprises a second particulate-type material and a third particulate-type material selected from the group consisting of $Al_2O_3$, $SiO_2$, $TiO_2$, $ZrO_2$, $BaO_x$, ZnO, $CaCO_3$, TiN, AlN, and combinations thereof, wherein x is 1 or 2.

In some embodiments, each of the first, second and third particulate-type materials independently has an average diameter from about 100 nm to about 20 μm, from about 100 nm to about 10 μm, from about 100 nm to about 2 μm, from about 100 nm to about 1 μm, from about 250 nm to about 1.5 μm, from about 300 nm to about 3 μm, from about 400 nm to about 2 μm, from about 500 nm to about 4.5 μm, from about 500 nm to about 6 μm, from about 800 nm to about 2.5 μm, from about 1 μm to about 20 μm, from about 1 μm to about 15 μm, from about 1 μm to about 10 μm, from about 1 μm to about 7.5 from about 1 μm to about 4.5 μm, from about 1 μm to about 3 μm, or from about 10 μm to about 20 μm.

In certain embodiment, a weight ratio of the second particulate-type material to the third particulate-type material in the second protective porous layer is from about 1:1 to about 99:1, from about 70:30 to about 95:5, from about 95:5 to about 35:65, from about 65:35 to about 45:55, from about 20:80 to about 99:1, from about 10:90 to about 99:1, from about 5:95 to about 99:1, from about 3:97 to about 99:1, from about 1:99 to about 99:1, or from about 1:99 to about 1:1.

In some embodiments, the second inorganic filler comprises a whisker-type material and does not comprise a particulate-type material. In certain embodiments, the second inorganic filler is a second whisker-type material selected from the group consisting of $Al_2O_3$, $SiO_2$, $TiO_2$, $ZrO_2$, $BaO_x$, ZnO, $CaCO_3$, TiN, AlN, $MTiO_3$, $K_2O \cdot nTiO_2$, $Na_2O \cdot mTiO_2$, and combinations thereof, wherein x is 1 or 2; M is Ba, Sr or Ca; n is 1, 2, 4, 6 or 8; and m is 3 or 6. In some embodiments, the second whisker-type material in the second protective porous layer is randomly oriented, forming a network structure.

In certain embodiments, each of the first whisker-type material and second whisker-type material independently has an average diameter from about 0.05 μm to about 3 μm, from about 0.1 μm to about 3 μm, from about 0.5 μm to about 3 μm, from about 0.5 μm to about 2 μm, from about 0.5 μm to about 1 μm, from about 0.6 μm to about 2 μm, or from about 0.8 μm to about 2 μm.

In some embodiments, each of the first whisker-type material and second whisker-type material independently has an average length from about 0.05 μm to about 30 μm, from about 0.05 μm to about 25 μm, from about 0.05 μm to about 20 μm, from about 0.1 μm to about 20 μm, from about 1 μm to about 20 μm, from about 1 μm to about 15 μm, from about 1 μm to about 10 μm, from about 1 μm to about 8 μm, from about 1 μm to about 5 μm, from about 2 μm to about 10 μm, from about 2 μm to about 8 μm, from about 3 μm to about 10 μm, from about 4 μm to about 20 μm, from about 4 μm to about 10 μm, from about 5 μm to about 20 μm, or from about 5 μm to about 10 μm.

In certain embodiments, each of the first whisker-type material and second whisker-type material independently has a ratio of length to diameter from about 5 to about 300, from about 5 to about 250, from about 5 to about 200, from about 5 to about 150, from about 5 to about 100, from about 6 to about 20, from about 6 to about 13, from about 6 to about 10, from about 25 to about 300, from about 25 to about 200, from about 25 to about 100, from about 50 to about 300, from about 50 to about 200, or from about 50 to about 100.

In some embodiments, each of the first whisker-type material and second whisker-type material independently has a ratio of length to diameter of about 5:1, about 8:1, about 10:1, about 15:1, about 20:1, about 50:1, about 100:1, or about 150:1.

In some embodiments, the second protective porous layer comprising a second particulate-type material and a third particulate-type material has a single-layered structure, wherein the second particulate-type material and the third particulate-type material are randomly distributed throughout the second protective porous layer.

In certain embodiments, the second protective porous layer comprising a second particulate-type material and a third particulate-type material has a two-layered structure comprising a first layer and a second layer, wherein the first layer is adjacent to the porous base material, and the second layer is on and in contact with the first layer. In some embodiments, the second particulate-type material resides in the first layer and the third particulate-type material resides in the second layer, or vice versa.

In some embodiments, the first and/or second protective porous layer may be asymmetric in pore size, i.e. an increasing gradation in pore size from one surface of the protective porous layer to the other surface thereof. In certain embodiments, the protective porous layer of the asymmetric separator possess their smallest or finest pores in the second layer of the protective porous layer, i.e. a side adjacent to an anode or a cathode, and the largest pores in the first layer of the protective porous layer, i.e. a side adjacent to a porous base material.

One of the biggest challenges facing rechargeable lithium-ion batteries is the growth of dendrites. A dendrite is a finger-like deposit of lithium metal, growing from the surface of a battery anode and may puncture the separator and ultimately reach the other electrode. When this happens, the battery can short-circuit, overheat and burst into flame.

If the pores in the separator are too big, the dendrites can grow right through the separator. In order to remedy that problem, pores should be small enough to prevent dendritic lithium penetration through them.

In some embodiments, the first protective porous layer is adjacent to an anode and the second protective porous layer is adjacent to a cathode. In certain embodiments, the first protective porous layer has a smaller pore size than the second protective porous layer. In some embodiments, the second protective porous layer has a smaller pore size than the first protective porous layer.

In other embodiments, the first protective porous layer is adjacent to a cathode and the second protective porous layer is adjacent to an anode. In some embodiments, the second protective porous layer has a smaller pore size than the first protective porous layer. In certain embodiments, the first protective porous layer has a smaller pore size than the second protective porous layer. Separators disclosed herein achieves a particularly high porosity with the pores being sufficiently small to prevent lithium dendrites growing through the separator and shows good anode compatibility.

The protective porous layer made of an inorganic filler that is bound via the organic binder has a structure wherein void space is formed between the inorganic filler. This void space constitutes pores of the protective porous layer. The protective porous layer of the present invention has uniform pore structures allowing lithium ions to move smoothly therethrough.

In addition, since pores present in the particulate-type material of the present invention have such a size that lithium ions solvated with electrolyte solvent molecules can sufficiently pass therethrough, they can serve as an additional pathway for lithium ions. Therefore, lithium ion conductivity in a battery is improved.

Moreover, the inorganic filler disclosed herein has high dielectric constant, which can contribute to increase the dissociation degree of an electrolyte salt in a liquid electrolyte, such as a lithium salt, thereby ensuring sufficient ionic conductivity. Besides, the porosity of protective porous layer adjacent to a cathode can also be suitably adjusted so as to ensure sufficient ionic conductivity.

There is no particular limitation in thickness of the protective porous layer of the present invention. In some embodiments, each of the first and second protective porous layers independently has a thickness from about 1 μm to about 100 μm, from about 1 μm to about 50 μm, from about 2 μm to about 30 μm, from about 2 μm to about 25 μm, from about 4 μm to about 20 μm, from about 4 μm to about 15 μm, from about 5 μm to about 25 μm, from about 5 μm to about 20 μm, from about 5 μm to about 15 μm, or from about 5 μm to about 10 μm.

The coating solution for a separator comprising an inorganic filler, organic binder, and solvent with desired ratio is coated onto at least one surface of a porous base material. The thickness of the protective porous layer coated onto the porous base material will depend upon the particular composition of the coating solution and the final thickness desired in the separator.

In some embodiments, the average thickness ratio of the first protective porous layer to the second protective porous layer is about 1:3, about 1:2, about 1:1.5, about 1:1.3, about 1:1, about 1.3:1, about 1.5:1, about 2:1, or about 3:1. The thickness of first and second protective porous layers can be suitably adjusted so as to obtain a separator according to the need.

Another advantage of the separator disclosed herein is that it has outstanding safety and exhibits no or very slight contraction at high temperature. It is because the inorganic filler which adheres to the porous base material has a melting point which is well above the safety-relevant temperature range for electrochemical cells and hence suppresses thermal contraction of the separator. In particular, a network structure is obtained by random orientation and distribution of the whisker-type material in the protective porous layer, which contributes to a superior resistance to thermal shrinkage.

In some embodiments, the protective porous layer of the present invention contains an inorganic filler and an organic binder. The inorganic filler could be joined to the nonwoven or to each other by the organic binder. In certain embodiments, the organic binder is an organic polymer. The use of the organic polymer makes it possible to produce a separator with adequate mechanical flexibility.

Some non-limiting examples of the organic binder include polyester, polyamide, polyether, polycarboxylates, polycarboxylic acid, polyvinyl compound, polyolefin, rubber, polyvinyl pyrrolidone, polyacrylic acid, polyacrylate, polymethacrylic acid, polymethacrylate, polystyrene, polyvinyl alcohol, polyvinyl acetate, polyacrylamide, cellulose, cellulose acetate, cellulose acetate butyrate, cellulose acetate propionate, carboxymethyl cellulose, cyanoethylcellulose, cyanoethylsucrose, polyurethane, nitrile butadiene rubber (NBR), styrene butadiene rubber (SBR), latex, acrylonitrile-styrene-butadiene copolymer, halogenated polymer, fluorinated polymer, chlorinated polymer, unsaturated polymer, conjugated diene polymer, and combinations thereof.

Some non-limiting examples of the polyvinyl compound include those that consist of N-vinylamide monomers such as N-vinyl formamide and N-vinyl acetamide or that contain these monomers. The poly-N-vinyl compound is characterized by good wettability. Homopolymers, copolymers, and block copolymers can also be used herein. In some embodiments, the polyvinyl compound is a random, block or alternating interpolymer. In further embodiments, the polyvinyl compound is a di-block, tri-block or other multi-block interpolymer.

Some non-limiting examples of the rubber include natural rubber, isoprene rubber, butadiene rubber, chloroprene rubber, styrene butadiene rubber, and nitrile butadiene rubber. These rubbers contain unsaturated double bonds. In some embodiments, the rubber is a random, block or alternating interpolymer. In further embodiments, the rubber is a di-block, tri-block or other multi-block interpolymer. Unsaturated polymers are generally characterized by good adhesive properties.

In some embodiment, the organic binder is a water-soluble polymer. In certain embodiment, the water-soluble polymer is a monomer containing a carboxylic acid group, a sulfonic acid group, or a combination thereof.

Some non-limiting examples of the monomer having a carboxylic acid group include monocarboxylic acid, dicarboxylic acid, anhydride of dicarboxylic acid, and derivatives thereof. Some non-limiting examples of the monocarboxylic acid include acrylic acid, methacrylic acid, crotonic acid, 2-ethylacrylic acid, and isocrotonic acid. Some non-limiting examples of the dicarboxylic acid include maleic acid, fumaric acid, itaconic acid, and methyl maleic acid. Some non-limiting examples of the anhydride of dicarboxylic acid include maleic anhydride, acrylic anhydride, methyl maleic anhydride, and dimethyl maleic anhydride.

Some non-limiting examples of the monomer having a sulfonic acid group include vinylsulfonic acid, methyl vinylsulfonic acid, (meth)allylsulfonic acid, styrenesulfonic acid, (meth)acrylic acid-2-ethyl sulfonate, 2-acrylamide-2-methylpropanesulfonic acid, 3-allyloxy-2-hydroxypropanesulfonic acid, and 2-(N-acryloyl)amino-2-methyl-1,3-propanedisulfonic acid.

By varying the concentration of the organic binder and inorganic filler in the slurry, control over the homogeneity of the organic binder can be obtained. In certain embodiments, the amount of the organic binder is distributed homogeneously throughout the protective porous layer.

In some embodiments, the protective porous layer is a single-layered structure and has a first side adjacent to the porous base material and a second side adjacent to an anode or a cathode, wherein an amount of the organic binder at the first side is greater than an amount of the organic binder at the second side.

In certain embodiments, the protective porous layer is a two-layered structure comprising a first layer and a second layer, wherein the first layer has a first side adjacent to the porous base material and the second layer has a second side adjacent to an anode or a cathode, wherein an amount of the organic binder at the first side is greater than an amount of the organic binder at the second side.

When more organic binder is included at the first side than at the second side, the separator may be better adhered to the porous base material. Hence, the separator disclosed herein has good peeling resistance.

There is no particular limitation in mixing ratio of an inorganic filler to an organic binder in the protective porous layer of the present invention. The mixing ratio of the inorganic filler to the organic binder can be controlled according to the thickness and structure of the protective porous layer to be formed.

In some embodiment, a weight ratio of the inorganic filler to the organic binder in the protective porous layer formed on the porous base material according to the present invention is from about 1:1 to about 99:1, from about 70:30 to about 95:5, from about 95:5 to about 35:65, from about 65:35 to about 45:55, from about 20:80 to about 99:1, from about 10:90 to about 99:1, from about 5:95 to about 99:1, from about 3:97 to about 99:1, from about 1:99 to about 99:1, or from about 1:99 to about 1:1.

If the weight ratio of the inorganic filler to the organic binder is less than 1:99, the content of binder is so great that pore size and porosity of the protective porous layer may be decreased. When the content of the inorganic filler is greater than 99 wt. %, the polymer content is too low to provide sufficient adhesion among the inorganic filler, resulting in degradation in mechanical properties and impaired peeling resistance of a finally formed protective porous layer.

In some embodiments, the protective porous layer disclosed herein may comprise at least one additive other than the inorganic filler and organic binder for the purposes of improving and/or controlling the processability, physical, chemical, and/or mechanical properties of the separator. Some non-limiting examples of the additive include a viscosity modifier, a surfactant, a defoaming agent, or a combination thereof. The additive is generally less than 2% by weight, or from about 0.1% to about 1% by weight, based on the total weight of the inorganic filler and organic binder.

A coating slurry added with the viscosity modifier can have high stability and low tendency to cause sedimentation or aggregation of solid content.

Some non-limiting examples of the viscosity modifier include cellulose derivatives such as carboxymethyl cellulose (CMC); poly(meth)acrylic acid salts such as sodium poly(meth)acrylate; polyvinyl alcohol, modified polyvinyl alcohol, and polyethylene oxide; polyvinylpyrrolidone, polycarboxylic acid, oxidized starch, starch phosphate, casein, modified starches, and chitin and chitosan derivatives.

Some non-limiting examples of the cellulose derivatives include carboxymethyl cellulose, carboxymethylethyl cellulose, methyl cellulose, ethyl cellulose, ethylhydroxyethyl cellulose, hydroxyethyl cellulose, hydroxypropyl cellulose, and ammonium salts and alkali metal salts thereof.

A surfactant can be used to improve the homogeneity and stability of the coating slurry and thus coating of the separator. This leads to the improved mechanical properties of the separator.

In some embodiment, the surfactant is a non-ionic surfactant. Some non-limiting examples of suitable non-ionic surfactant include alkoxylated alcohol, carboxylic ester, polyethylene glycol ester, and combinations thereof. Some non-limiting examples of suitable alkoxylated alcohol include ethoxylated and propoxylated alcohols. Some non-limiting examples of suitable ethoxylated alcohols include octylphenol ethoxylates and nonylphenol ethoxylates.

The separator of the present invention exhibits high and similar tensile strengths in both the TD and MD directions and hence a high tearing resistance. In some embodiment, a difference in tensile strength of separator along the TD direction and MD direction is about 30% or less, about 25% or less, about 20% or less, about 18% or less, about 15% or less, about 13% or less, about 10% or less, about 8% or less, or about 5% or less. A separator having this difference in tensile strength along the TD direction and MD direction has good thermal resistance and physical strength and can prevent the separator from being damaged during assembly into battery.

When the separator has a significant difference between tensile strength along the TD and MD directions, mechanical strength of the separator can be reduced, thereby deteriorating puncture strength of the separator.

The separator disclosed herein exhibits a high porosity. The pore size and porosity of the separator are mainly dependent on the size and shape of the inorganic filler. In some embodiment, the separator of the present invention has a porosity from about 30% to about 99%, from about 40% to about 95%, from about 50% to about 95%, from about 50% to about 90%, from about 60% to about 90%, from about 70% to about 90%, from about 40% to about 75%, from about 20% to about 60%, from about 35% to about 60%, from about 45% to about 55%, or from about 30% to about 50%.

In some embodiment, the separator of the present invention has a porosity of more than 40%, more than 50%, more than 55%, more than 60%, more than 65%, more than 70%, more than 75%, more than 80%, more than 85%, more than 90%, or more than 95%. A separator having this porosity can yield a battery with a good ion permeability.

The large porosity of the substrate means a higher porosity for the separator of the present invention, which is why a higher uptake of electrolytes is obtainable with the separator of the present invention.

The concomitant use of two inorganic fillers allows us to control the pore size and porosity of the protective porous layer by varying the particle diameter and ratio of the two inorganic fillers.

In some embodiment, each of the first and second protective porous layers of the separator of the present invention independently has an average pore size from about 1 nm to about 350 nm, from about 1 nm to about 100 nm, from about 20 nm to about 100 nm, from about 40 nm to about 350 nm, from about 40 nm to about 80 nm, from about 50 nm to about 80 nm, from about 0.1 $\mu$m to about 70 $\mu$m, from about 1 $\mu$m to about 60 $\mu$m, from about 1 $\mu$m to about 50 $\mu$m, from about 1 $\mu$m to about 40 $\mu$m, from about 1 $\mu$m to about 30 $\mu$m, from about 1 $\mu$m to about 20 $\mu$m, from about 1 $\mu$m to about 10 $\mu$m, from about 1 $\mu$m to about 5 $\mu$m, or from about 1 $\mu$m to about 3 $\mu$m.

In some embodiment, the separator disclosed herein comprises a first protective porous layer having a first average pore diameter and a second protective porous layer having a second average pore diameter. In some embodiment, the first and second average pore diameters have an asymmetry of about 1.5:1, about 2:1 about 3:1, about 4:1, about 5:1, about 10:1, about 20:1, about 50:1, about 100:1, about 1:1.5, about 1:2 about 1:3, about 1:4, about 1:5, about 1:10, about 1:20, about 1:50, or about 1:100.

Separator of the present invention prevents short circuits due to metal dendrite growth. No dendrite penetration can form from one side to the other side of the separator. Contrary to cylindrical pores of a separator, it is conceivable that the pores might form a labyrinthine structure in which no dendrite penetration can form from one side to the other side of the separator. Therefore, there is no need to increase the thickness of the separator for preventing dendrite penetration. A separator that is too thick can compromise battery capacity.

In some embodiments, the separator has a thickness from about 10 $\mu$m to about 200 $\mu$m, from about 30 $\mu$m to about 100 $\mu$m, from about 10 $\mu$m to about 75 $\mu$m, from about 10 $\mu$m to about 50 $\mu$m, from about 10 $\mu$m to about 20 $\mu$m, from about 15 $\mu$m to about 40 $\mu$m, from about 15 $\mu$m to about 35 $\mu$m, from about 20 $\mu$m to about 40 $\mu$m, from about 20 $\mu$m to about 35 $\mu$m, from about 20 $\mu$m to about 30 $\mu$m, from about 30 µm to about 60 µm, from about 30 µm to about 50 µm, or from about 30 µm to about 40 µm.

In some embodiment, the separator of the present invention has a thickness of less than 40 µm, less than 35 µm, less than 30 µm, less than 25 µm, or less than 20 µm. A separator having this thickness can yield a battery with a high power density.

In another aspect, provided herein is a method for producing a battery, comprising, inserting the separator disclosed herein into the battery.

Also provided herein is a lithium battery comprising the separator disclosed herein.

The separators according to the present invention are highly suitable for use in fast charging batteries. A battery equipped with this separator is heat-resistant, and is therefore able to tolerate the temperature increase due to the rapid charging without adverse changes to the separator and/or damages to the battery. These batteries consequently can have a very rapid charging rate.

This is a distinct advantage when batteries equipped with the separator disclosed herein are used in electric vehicles or hybrid vehicles, since fast charging is feasible in the course of an hour or less.

The nail penetration test is an important method to access the safety of Li-ion cells presumably to simulate internal shorts, which is widely used across the battery industry and battery-user community. It involves driving a metallic nail through a charged Li-ion cell at a prescribed speed. The cell is deemed to have passed if there is no smoke or flame following the puncturing, by visually confirmation.

In the nail penetration test, a nail was used to puncture a battery. A short circuit current flows through the nail and causes a thermal runaway with a sharp temperature rise. The separator disclosed herein does not exhibit a large degree of shrinkage. Even though the polymer is at or above its melting point or partially dissolved, the structure of the protective porous layer does not collapse. Only the polymeric porous base material would slightly melt at the site of puncture and contract but not the inorganic filler. Therefore, the short circuit location does not further expand. The separator disclosed herein has a high stability. In this manner, the organic separator plays a role of keeping safety of the lithium ion secondary battery and this safety feature is particularly important for automotive use.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The tensile strengths of the separators (Examples 1-6) below were measured by a universal testing machine UTM (obtained from MTS Systems Corporation, US; model no. MTS 895). Each of the separators was cut into a rectangular shape having a size of 10 mm×50 mm (length (MD)×width (TD)) at 10 different regions to obtain 10 specimens. Then, each of the specimens was placed in the machine between the grips and gripped to have a length of 20 mm, followed by measurement of average tensile strength in the machine direction (MD) and the transverse direction (TD) while applying pulling force to the specimen at room temperature. The stress at break was taken as tensile strength.

The thickness of each separator was measured using a contact thickness meter (obtained from Sony Manufacturing Systems Corporation, JP; model no. digital micrometer M-30).

The porosity can be determined by the known method of mercury porosimetry in accordance with DIN 66133. Porosimetry is an analytical technique used to determine various quantifiable aspects of a material's porous nature. This technique measures the pressure required to force mercury into membrane pores through the use of a porosimeter.

The nail penetration test was conducted by passing a stainless steel nail with 3 mm diameter and 80° taper angle through the test cell in a state of charge of 95% with a speed of 1 cm/second.

The chemicals were purchased and used as received.

Preparation of Asymmetric Separators

Example 1

A first aqueous binder solution was prepared by dissolving 20 g of carboxymethyl cellulose (CMC) (obtained from DAICEL Corporation, Japan; product no. CMC1390) in 3.35 L de-ionized water. To the first aqueous binder solution were added 50 g of $K_2TiO_3$ whiskers (obtained from Shanghai Dian Yang Industry Co. LTD, China) and 3 g of styrene butadiene rubber (SBR) (obtained from NIPPON A&L INC., Japan; product no. AL-2001). The whiskers had an average diameter of 0.5 µm and an average length of 4 µm. After the addition, the suspension was stirred for 30 minutes at room temperature at a stirring speed of 50 rpm (revolution per minute) to form a first slurry.

A second aqueous binder solution was prepared by dissolving 30 g of CMC in 3.2 L de-ionized water. To the second aqueous binder solution were added 60 g of $Al_2O_3$ particles (obtained from Taimei Chemicals Co. Ltd., Japan; product no. TM-100) and 4 g of SBR. The particles had an average diameter of 8 µm. After the addition, the suspension was stirred for 30 minutes at room temperature at a stirring speed of 50 rpm to form a second slurry.

A 30 cm wide nonwoven PET fabric (obtained from MITSUBISHI PAPER MILLS LTD, Japan) having a thickness of about 20 µm and a weight per unit area of about 10 g/m² was then coated with the first slurry by a continuous roll coater having a doctor blade (obtained from Shenzhen KEJINGSTAR Technology Ltd., China; model no. AFA-EI300-UL). The nonwoven subsequently passed through an oven and dried at a temperature of 90° C. in a hot air stream. The coating speed was in the range of 1.0-1.4 meter/minute. A coating thickness can be controlled by an adjustable gap width between a coating blade and coating surface, and a coated separator having a first protective porous layer with a thickness of about 4 µm was obtained and a porosity of about 68% was obtained. The average pore size of the first coating layer is about 230 nm. The coated separator obtained was further coated with the second slurry on the opposite side of the first protective porous layer by a continuous roll coater having a doctor blade to form a second protective porous layer. The nonwoven subsequently passed through an oven and dried at a temperature of 100° C. in a hot air stream. The coating speed was in the range of 1.0-1.4 meter/minute. A coating thickness can be controlled by an adjustable gap width between a coating blade and coating surface. A coated separator comprising the first and second protective porous layers having a final total thickness of about 32 µm and a porosity of about 55% was obtained. The second protective porous layer has an average pore size of 65 nm.

Example 2

A first aqueous binder solution was prepared by dissolving 20 g of CMC in 3.35 L de-ionized water. To the first aqueous binder solution were added 55 g of $K_2Ti_6O_{13}$ whiskers (obtained from Shanghai Dian Yang Industry Co. LTD, China) and 3 g of SBR. The whiskers had an average diameter of 2 µm and an average length of 20 µm. After the addition, the suspension was stirred for 30 minutes at room temperature at a stirring speed of 50 rpm to form a first slurry.

A second aqueous binder solution was prepared by dissolving 30 g of CMC in 3.2 L de-ionized water. To the second aqueous binder solution were added 45 g of $SiO_2$ particles (obtained from Sigma-Aldrich, US; product no. S5631) and 4 g of SBR. The particles had an average diameter of 3 µm. After the addition, the suspension was stirred for 30 minutes at room temperature at a stirring speed of 50 rpm to form a second slurry.

A 30 cm wide nonwoven PET fabric (obtained from MITSUBISHI PAPER MILLS LTD, Japan) having a thickness of about 20 µm and a weight per unit area of about 10 g/m² was then coated with the first slurry by a continuous roll coater having a doctor blade. The nonwoven subsequently passed through an oven and dried at a temperature of 100° C. in a hot air stream. The coating speed was in the range of 1.2-1.5 meter/minute. A coating thickness can be controlled by an adjustable gap width between a coating blade and coating surface, and a coated separator having a first protective porous layer with a thickness of about 6 µm was obtained and a porosity of about 70% was obtained. The average pore size of the first coating layer is about 310 nm. The coated separator obtained was further coated with the second slurry on the opposite side of the first protective porous layer by a continuous roll coater having a doctor blade to form a second protective porous layer. The nonwoven subsequently passed through an oven and dried at a temperature of 100° C. in a hot air stream. The coating speed was in the range of 1.2-1.5 meter/minute. A coating thickness can be controlled by an adjustable gap width between a coating blade and coating surface. A coated separator comprising the first and second protective porous layers having a final total thickness of about 32 µm and a porosity of about 56% was obtained. The second protective porous layer has an average pore size of 48 nm.

Example 3

A first aqueous binder solution was prepared by dissolving 55 g of CMC in 6.55 L de-ionized water. To the first aqueous binder solution were added 50 g of $Al_2O_3$ particles (obtained from Taimei Chemicals Co. Ltd., Japan; product no. TM-100), 65 g of $K_2TiO_3$ whiskers (obtained from Shanghai Dian Yang Industry Co. LTD, China), and 8.0 g of SBR. The particles had an average diameter of 6 µm. The whiskers had an average diameter of 0.6 µm and an average length of 12 µm. After the addition, the suspension was stirred for 60 minutes at room temperature at a stirring speed of 50 rpm to form a first slurry.

A second aqueous binder solution was prepared by dissolving 30 g of CMC in 3.2 L de-ionized water. To the second aqueous binder solution were added 60 g of $ZrO_2$ particles (obtained from Shanghai Dian Yang Industry Co. LTD, China; product no. ZR-25(M)) and 4 g of SBR. The particles had an average diameter of 3 µm. After the addition, the suspension was stirred for 30 minutes at room temperature at a stirring speed of 50 rpm to form a second slurry.

A 30 cm wide nonwoven PET fabric (obtained from MITSUBISHI PAPER MILLS LTD, Japan) having a thickness of about 20 µm and a weight per unit area of about 10 g/m² was then coated with the first slurry by a continuous roll coater having a doctor blade. The nonwoven subsequently passed through an oven and dried at a temperature of 100° C. in a hot air stream. The coating speed was in the range of 1.0-1.4 meter/minute. A coating thickness can be controlled by an adjustable gap width between a coating blade and coating surface, and a coated separator having a first protective porous layer with a thickness of about 10 µm was obtained and a porosity of about 55% was obtained. The average pore size of the first coating layer is about 170 nm. The coated separator obtained was further coated with the second slurry on the opposite side of the first protective porous layer by a continuous roll coater having a doctor blade to form a second protective porous layer. The nonwoven subsequently passed through an oven and dried at a temperature of 100° C. in a hot air stream. The coating speed was in the range of 1.5-1.8 meter/minute. A coating thickness can be controlled by an adjustable gap width between a coating blade and coating surface. A coated separator comprising the first and second protective porous layers having a final total thickness of about 35 µm and a porosity of about 52% was obtained. The second protective porous layer has an average pore size of 45 nm.

Example 4

A first aqueous binder solution was prepared by dissolving 15 g of CMC in 3.35 L de-ionized water. To the first aqueous binder solution were added 25 g of $Al_2O_3$ particles (obtained from Taimei Chemicals Co. Ltd., Japan; product no. TM-100) and 3 g of SBR. The particles had an average diameter of 6 µm. After the addition, the suspension was stirred for 30 minutes at room temperature at a stirring speed of 50 rpm to form a first slurry.

A second aqueous binder solution was prepared by dissolving 15 g of CMC in 3.35 L de-ionized water. To the second aqueous binder solution were added 33 g of $K_2TiO_3$ whiskers (obtained from Shanghai Dian Yang Industry Co. LTD, China) and 3 g of SBR. The whiskers had an average diameter of 0.6 µm and an average length of 12 µm. After the addition, the suspension was stirred for 30 minutes at room temperature at a stirring speed of 50 rpm to form a second slurry.

A third aqueous binder solution was prepared by dissolving 30 g of CMC in 3.2 L de-ionized water. To the third aqueous binder solution were added 60 g of $ZrO_2$ particles (obtained from Shanghai Dian Yang Industry Co. LTD, China; product no. ZR-25(M)) and 4 g of SBR. The particles had an average diameter of 3 µm. After the addition, the suspension was stirred for 30 minutes at room temperature at a stirring speed of 50 rpm to form a third slurry.

A 30 cm wide nonwoven PET fabric (obtained from MITSUBISHI PAPER MILLS LTD, Japan) having a thickness of about 20 µm and a weight per unit area of about 10 g/m² was then coated with the first slurry by a continuous roll coater having a doctor blade. The nonwoven subsequently passed through an oven and dried at a temperature of 100° C. in a hot air stream. The coating speed was in the range of 1.0-1.4 meter/minute. A coating thickness was controlled by an adjustable gap width between a coating blade and coating surface, and a coated separator having a first layer of a first protective porous layer with a thickness of about 8 μm was obtained. The coated separator obtained was further coated with the second slurry by a continuous roll coater having a doctor blade to form a second layer of the first protective porous layer. The nonwoven subsequently passed through an oven and dried at a temperature of 100° C. in a hot air stream. The coating speed was in the range of 1.0-1.4 meter/minute. A coating thickness was controlled by an adjustable gap width between a coating blade and coating surface. A coated separator comprising the first and second layers of the first protective porous layer having a final total thickness of about 35 μm and a porosity of about 54% was obtained. The average pore size of the first coating layer is about 68 nm.

The coated separator obtained was further coated with the third slurry on the opposite side of the first protective porous layer by a continuous roll coater having a doctor blade to form a second protective porous layer. The nonwoven subsequently passed through an oven and dried at a temperature of 100° C. in a hot air stream. The coating speed was in the range of 1.5-1.8 meter/minute. A coating thickness can be controlled by an adjustable gap width between a coating blade and coating surface. A coated separator comprising the first and second protective porous layers having a final total thickness of about 41 μm and a porosity of about 49% was obtained. The second protective porous layer has an average pore size of 42 nm.

Example 5

A first aqueous binder solution was prepared by dissolving 12 g of CMC in 3.35 L de-ionized water. To the first aqueous binder solution were added 50 g of $Na_2Ti_6O_{13}$ whiskers (obtained from Shanghai Whisker Composite Manufacturing Co. Ltd., China) and 3 g of SBR. The whiskers had an average diameter of 0.8 μm and an average length of 4.5 μm. After the addition, the suspension was stirred for 30 minutes at room temperature at a stirring speed of 50 rpm to form a first slurry.

A second aqueous binder solution was prepared by dissolving 30 g of CMC in 3.2 L de-ionized water. To the second aqueous binder solution were added 30 g of $ZrO_2$ particles (obtained from Shanghai Dian Yang Industry Co. LTD, China; product no. ZR-25(M)) with an average diameter of 2 μm, $TiO_2$ particles (obtained from Shanghai Dian Yang Industry Co. LTD, China) with an average diameter of 12 μm, and 4 g of SBR. After the addition, the suspension was stirred for 30 minutes at room temperature at a stirring speed of 50 rpm to form a second slurry.

A 30 cm wide nonwoven PET fabric (obtained from MITSUBISHI PAPER MILLS LTD, Japan) having a thickness of about 20 μm and a weight per unit area of about 10 g/m² was then coated with the first slurry by a continuous roll coater having a doctor blade. The nonwoven subsequently passed through an oven and dried at a temperature of 100° C. in a hot air stream. The coating speed was in the range of 1.2-1.6 meter/minute. A coating thickness can be controlled by an adjustable gap width between a coating blade and coating surface, and a coated separator having a first protective porous layer with a thickness of about 12 μm was obtained and a porosity of about 68% was obtained. The average pore size of the first coating layer is about 280 nm. The coated separator obtained was further coated with the second slurry on the opposite side of the first protective porous layer by a continuous roll coater having a doctor blade to form a second layer of a protective porous layer. The nonwoven subsequently passed through an oven and dried at a temperature of 100° C. in a hot air stream. The coating speed was in the range of 1.5-1.8 meter/minute. A coating thickness can be controlled by an adjustable gap width between a coating blade and coating surface. A coated separator comprising the first and second protective porous layers having a final total thickness of about 37 μm and a porosity of about 51% was obtained. The second protective porous layer has an average pore size of 51 nm.

Preparation of a Symmetric Separator

Example 6

An aqueous binder solution was prepared by dissolving 30 g of CMC in 3.2 L de-ionized water. To the aqueous binder solution were added 60 g of $Al_2O_3$ particles (obtained from Taimei Chemicals Co. Ltd., Japan; product no. TM-100) and 4 g of SBR. The particles had an average diameter of 8 μm. After the addition, the suspension was stirred for 30 minutes at room temperature at a stirring speed of 50 rpm to form a slurry.

On one side of a 30 cm wide nonwoven PET fabric (obtained from MITSUBISHI PAPER MILLS LTD, Japan) having a thickness of about 20 μm and a weight per unit area of about 10 g/m² was then coated with the above slurry by a continuous roll coater having a doctor blade. The nonwoven subsequently passed through an oven and dried at a temperature of 100° C. in a hot air stream. The coating speed was in the range of 1.0-1.4 meter/minute. A coating thickness can be controlled by an adjustable gap width between a coating blade and coating surface, and a coated separator having a first protective porous layer with a thickness of about 6 μm was obtained and a porosity of about 65% was obtained. The average pore size of the first coating layer is about 59 nm. The coated separator obtained was further coated with the same slurry on the opposite side of the first protective porous layer by a continuous roll coater having a doctor blade to form a second protective porous layer. The nonwoven subsequently passed through an oven and dried at a temperature of 100° C. in a hot air stream. The coating speed was in the range of 1.0-1.4 meter/minute. A coating thickness can be controlled by an adjustable gap width between a coating blade and coating surface. A coated separator comprising the first and second protective porous layers having a final total thickness of about 32 μm and a porosity of about 59% was obtained. The first and second protective porous layers have an average pore diameter of 57 nm.

The tensile strength of separators of Examples 1-6 were measured. Table 1 shows the tensile strength test results of separators of Examples 1-6 respectively.

TABLE 1

| Property | Test direction | Example 1 | Example 2 | Example 3 | Example 4 | Example 5 | Example 6 |
|---|---|---|---|---|---|---|---|
| Tensile strength (MPa) | MD | 22.13 | 20.64 | 18.94 | 18.13 | 19.27 | 17.21 |
|  | TD | 20.33 | 18.52 | 16.70 | 16.72 | 16.82 | 15.22 |
| Tensile strength ratio | MD/TD | 1.09 | 1.11 | 1.13 | 1.08 | 1.15 | 1.13 |

Based on the MD and TD data in Table 1 above, the MD and TD values of Examples 1-5 are higher than those of Example 6. Therefore, there is a noticeable improvement in mechanical strength of separators coated with a whisker-type material over a particular-type material.

Based on the tensile strength ratio (i.e. difference in tensile strength along the TD direction and MD direction) in Table 1 above, the tensile strength ratios of Examples 1-6 are equal to or less than 15%. Because of its high mechanical strength in the TD and MD directions, the separator can be prevented from being damaged at the step of winding the separator, making it possible to reduce percent defective attributed to the separator for battery.

Example 7

Assembling of Pouch-Type Full Lithium-Ion Batteries
Preparation of Positive Electrodes The positive electrode slurry was prepared by mixing 94 wt. % cathode material (LNMC TLM 310, obtained from Xinxiang Tianli Energy Co. Ltd., China), 3 wt. % carbon black (SuperP; obtained from Timcal Ltd, Bodio, Switzerland) as a conductive agent, and 3 wt. % polyvinylidene fluoride (PVDF; Solef® 5130, obtained from Solvay S.A., Belgium) as a binder and dispersed in N-methyl-2-pyrrolidone (NMP; purity of ≥99%, obtained from Sigma-Aldrich, USA) to form a slurry with a solid content of 50 wt. %. The slurry was then uniformly spread onto aluminum foil as a current collector using a doctor blade coater (obtained from Shenzhen KejingStar Technology Ltd., China; model no. MSK-AFA-III) and dried at 50° C. for 12 hours to obtain a cathode aluminum film.

Preparation of Negative Electrodes

The negative electrode slurry was prepared by mixing 90 wt. % of hard carbon (HC; purity of 99.5%, obtained from Ruifute Technology Ltd., Shenzhen, Guangdong, China) with 5 wt. % polyvinylidene fluoride (PVDF) as a binder and 5 wt. % carbon black as a conductive agent and dispersed in N-methyl-2-pyrrolidone to form another slurry with a solid content of 50 wt. %. The slurry was then uniformly spread onto copper foil as a current collector using a doctor blade coater and dried at 50° C. for 12 hours to obtain an anode copper film.

Assembling of Pouch-Type Batteries

After drying, the resulting cathode film and anode film were used to prepare the cathode sheet and anode sheet respectively by cutting into pieces of square shape in the size of 12 cm×16 cm. Two pouch-type batteries were prepared by stacking the cathode and anode sheets in an alternating manner and are separated by the separator prepared in Examples 1 and 6 respectively for comparison. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. The cells were assembled in high-purity argon atmosphere with moisture and oxygen content <1 ppm. After electrolyte filling, the pouch cells using different separators were vacuum sealed and then mechanically pressed using a punch tooling with standard shape.

Electrochemical Measurements of Batteries with Separators of Examples 1 and 6
Nominal Capacity The cells were tested galvanostatically at a current density of C/2 at 25° C. on a multi-channel battery tester between 2.9 V and 4.2 V. The nominal capacity for cell made with separator of Example 1 was about 20 Ah, and for cell made with separator of Example 6 was about 20 Ah.

Cyclability Performance

Figure 3:
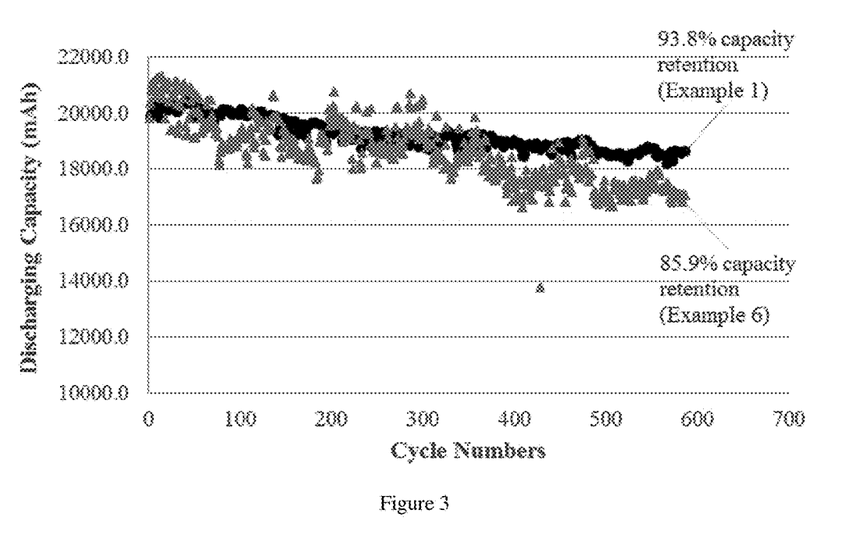
FIG. 3 depicts the cycling performance of full lithium-ion battery cells having separators of Examples 1 and 6 respectively.

The cyclability performance of the pouch cells made with the separators of Examples 1 and 6 respectively was tested by charging and discharging at a constant current rate of 1 C between 3.0 V and 4.2 V. Test results of cyclability performance are shown in FIG. 3. As can be seen from FIG. 3, the capacity retentions of Examples 1 and 6 after 596 cycles were about 93.8% and 85.9% of the initial value respectively.

The pouch cell having the asymmetric separator of Example 1 exhibits superior capacity retention of higher than about 9.2%, compared to the pouch cell having the symmetric separator of Example 6. The pouch cell having the separator of Example 1 shows better cyclability due to better compatibility and higher ion permeability of the separator of Example 1, compared to the pouch cell having the symmetric separator of Example 6.

As can be seen from FIG. 3, the pouch cell made with the separator of Example 1 exhibits best cycling stability. The capacity retention of the pouch cell having the separator of Example 1 slowly decreases with cycle number at a relatively constant rate, whereas the capacity retention of the pouch cell having the separator of Example 6 exhibits unstable and fluctuating cycling performance over the whole cycles. The stable performance of pouch cell having asymmetric separator of Example 1 also proves that the improved compatibility of the asymmetric separator with the electrodes.

Nail Penetration Test

Safety tests were conducted on a pouch cell made of the separators of Examples 1 and 6, and a commercial battery cell (obtained from Shandong Hengyu New Energy Co., Ltd., China) made of a multi-transition metal (Ni, Mn, Co) oxide cathode material. They had the same capacity of 20 Ah and the size of 160 mm (L)×120 mm (W)×10 mm (T) and are in a state of charge above 95%. The nail penetration test for the pouch cell made of the separators of Examples 1 and 6 showed no generation of smoke or ignition, whereas the commercial battery cell suffered ignition immediately after penetration of nail. Therefore, a high level of safety with no smoke or ignition was achieved in the nail penetration test of the cell made of the separators of the present invention.

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A secondary-battery separator comprising, a porous base material, a first protective porous layer coated on one side of the porous base material, and a second protective porous layer coated on the other side of the porous base material,
wherein the first protective porous layer comprises an organic binder, and a first inorganic filler;
wherein the first inorganic filler is a first whisker-type material selected from the group consisting of $Al_2O_3$, $SiO_2$, $TiO_2$, $ZrO_2$, $BaO_x$, $ZnO$, $CaCO_3$, $TiN$, $AlN$, $MTiO_3$, $K_2O.nTiO_2$, $Na_2O.mTiO_2$ and combinations thereof, wherein x is 1 or 2; M is Ba, Sr or Ca; n is 1, 2, 4, 6 or 8; and m is 3 or 6; wherein the first whisker-type material is randomly distributed throughout the first protective porous layer;
wherein the second protective porous layer comprises an organic binder, and a second inorganic filler; wherein the second inorganic filler is a second particulate-type material selected from the group consisting of $Al_2O_3$, $SiO_2$, $TiO_2$, $ZrO_2$, $BaO_x$, $ZnO$, $CaCO_3$, $TiN$, $AlN$, and combinations thereof, wherein x is 1 or 2;
wherein the organic binder is selected from the group consisting of a polyester, polyamide, polyether, polyimide, polycarboxylate, polycarboxylic acid, polyvinyl compound, polyolefin, rubber, polyvinyl pyrrolidone, polyacrylic acid, polyacrylate, polymethacrylic acid, polymethacrylate, polystyrene, polyvinyl alcohol, polyvinyl acetate, polyacrylamide, cellulose, cellulose acetate, cellulose acetate butyrate, cellulose acetate propionate, carboxymethyl cellulose, cyanoethylcellulose, cyanoethylsucrose, polyurethane, nitrile butadiene rubber (NBR), styrene butadiene rubber (SBR), latex, acrylonitrile-styrene-butadiene copolymer, fluorinated polymer, chlorinated polymer, and combinations thereof; and
wherein the difference in tensile strength of the separator along the TD direction and MD direction is about 15% or less.

2. The secondary-battery separator of claim 1, wherein the first whisker-type material has a diameter from about 0.05 μm to about 3 μm, and a ratio of length to diameter from about 5 to about 300.

3. The secondary-battery separator of claim 1, wherein the first inorganic filler further comprises a first particulate-type material selected from the group consisting of $Al_2O_3$, $SiO_2$, $TiO_2$, $ZrO_2$, $BaO_x$, $ZnO$, $CaCO_3$, $TiN$, $AlN$, and combinations thereof, wherein x is 1 or 2; and wherein the first particulate-type material has a diameter from about 100 nm to about 10 μm.

4. The secondary-battery separator of claim 3, wherein the first protective porous layer is a single-layered structure, and wherein the first particulate-type material is randomly distributed throughout the first protective porous layer.

5. The secondary-battery separator of claim 3, wherein the first protective porous layer is a two-layered structure comprising a first layer and a second layer, wherein the first layer is adjacent to the porous base material, and the second layer is on and in contact with the first layer, and wherein the first particulate-type material resides in the first layer and the first whisker-type material resides in the second layer.

6. The secondary-battery separator of claim 5, wherein the average thickness ratio of the second layer to the first layer is from about 1:3 to about 3:1.

7. The secondary-battery separator of claim 1, wherein the second particulate-type material has a diameter from about 1 μm to about 15 μm.

8. The secondary-battery separator of claim 7, wherein the second inorganic filler further comprises a third particulate-type material selected from the group consisting of $Al_2O_3$, $SiO_2$, $TiO_2$, $ZrO_2$, $BaO_x$, $ZnO$, $CaCO_3$, $TiN$, $AlN$, and combinations thereof, wherein x is 1 or 2; and wherein the third particulate-type material has a diameter from about 400 nm to about 2 μm.

9. The secondary-battery separator of claim 1, wherein the second inorganic filler is a second whisker-type material selected from the group consisting of $Al_2O_3$, $SiO_2$, $TiO_2$, $ZrO_2$, $BaO_x$, $ZnO$, $CaCO_3$, $TiN$, $AlN$, $MTiO_3$, $K_2O.nTiO_2$, $Na_2O.mTiO_2$, and combinations thereof, wherein x is 1 or 2; M is Ba, Sr or Ca; n is 1, 2, 4, 6 or 8; and m is 3 or 6.

10. The secondary-battery separator of claim 1, wherein the first protective porous layer is adjacent to a cathode and the second protective porous layer is adjacent to an anode.

11. The secondary-battery separator of claim 1, wherein the second protective porous layer has a smaller pore size than the first protective porous layer.

12. The secondary-battery separator of claim 1, wherein the average thickness ratio of the first protective porous layer to the second protective porous layer is from about 1:3 to about 3:1.

13. The secondary-battery separator of claim 1, wherein the porous base material is a non-woven polymeric fiber selected from the group consisting of polyester, polyacetal, polyamide, polycarbonate, polyimide, polyetherether ketone, polyether sulfone, polyphenylene oxide, polyphenylene sulfide, polyethylene naphthalate, and combinations thereof.

14. The secondary-battery separator of claim 13, wherein the polyester is polyethylene terephthalate, polybutylene terephthalate, or a combination thereof.

15. The secondary-battery separator of claim 1, wherein the weight ratio of the first or second inorganic filler to the organic binder is from about 99:1 to about 1:1.

16. The secondary-battery separator of claim 1, wherein the separator has a thickness from about 1 μm to about 80 μm, and a porosity from about 40% to about 97%.

17. A method for producing a battery, comprising, inserting the separator as claimed in claim 1 into the battery.

18. A lithium battery comprising the separator as claimed in claim 1.

* * * * *